(12) United States Patent
Pranov et al.

(10) Patent No.: US 9,646,235 B2
(45) Date of Patent: May 9, 2017

(54) METHOD AND APPARATUS FOR PRODUCING A 2D BARCODE ENCODED PART BY MOLDING BEING IDENTIFIABLE USING A SMARTPHONE

(71) Applicant: INMOLD BIOSYSTEMS A/S, Taastrup (DK)

(72) Inventors: Henrik Pranov, Espergaerde (DK); Guggi Kofod, København N (DK)

(73) Assignee: INMOLD BIOSYSTEMS A/S, Taastrup (DK)

(*) Notice: Subject to any disclaimer, the term of this patent is extended or adjusted under 35 U.S.C. 154(b) by 0 days.

(21) Appl. No.: 14/784,006

(22) PCT Filed: Apr. 11, 2014

(86) PCT No.: PCT/DK2014/000018
§ 371 (c)(1),
(2) Date: Oct. 12, 2015

(87) PCT Pub. No.: WO2014/166491
PCT Pub. Date: Oct. 16, 2014

(65) Prior Publication Data
US 2016/0070999 A1  Mar. 10, 2016

(30) Foreign Application Priority Data

Apr. 13, 2013  (DK) ................................ 2013 00222

(51) Int. Cl.
*G06K 19/06*  (2006.01)
*B29C 45/37*  (2006.01)
(Continued)

(52) U.S. Cl.
CPC ...... *G06K 19/06037* (2013.01); *B29C 33/428* (2013.01); *B29C 45/2681* (2013.01);
(Continued)

(58) Field of Classification Search
CPC ............ G06K 19/06037; B29C 33/428; B29C 45/374; B29K 2995/003; B29K 2995/0044
(Continued)

(56) References Cited

U.S. PATENT DOCUMENTS 4,342,549 A  8/1982 Lemelson
5,461,239 A  10/1995 Atherton
(Continued)

FOREIGN PATENT DOCUMENTS

DE  10 2008 024936  1/2010
DE  10 2010 023098  12/2011
(Continued)

OTHER PUBLICATIONS

International Search Report mailed Jul. 8, 2014 in International Patent Application No. PCT/DK2014/000018.
(Continued)

*Primary Examiner* — Paultep Savusdiphol
(74) *Attorney, Agent, or Firm* — Pillsbury Winthrop Shaw Pittman LLP (57) ABSTRACT

A method for producing a part by molding with an embedded 2D barcode defined in the surface of the part and the embedded 2D barcode subsequently being readable using a light source and a camera, the method including providing a mold with an array of individual areas of optical anisotropic surface structures, where at least a number of the individual optical anisotropic structures forms a two-dimensional barcode or data matrix; making a replica of the mold, the replica including the array having the property that the directional reflection coefficient of the individual areas of optical anisotropic surface structures is depending on the illumination angle and detection angle in a way that is not rotational symmetric around the axis normal to the surface
(Continued)

of the replica, the array being readable by illumination and detection of reflection intensity of the illumination source under a non-normal angle to the surface of the replica.

16 Claims, 8 Drawing Sheets

(51) Int. Cl.
  *B29C 33/42* (2006.01)
  *B29D 11/00* (2006.01)
  *B29C 45/26* (2006.01)
  *B29K 105/00* (2006.01)

(52) U.S. Cl.
  CPC ...... *B29C 45/374* (2013.01); *B29D 11/00769* (2013.01); *B29K 2105/00* (2013.01); *B29K 2995/003* (2013.01)

(58) Field of Classification Search
  USPC .............................................. 235/462.11, 494
  See application file for complete search history.

(56) References Cited

U.S. PATENT DOCUMENTS

| | | | |
|---|---|---|---|
| 5,625,619 A | 4/1997 | Toda et al. | |
| 6,005,691 A | 12/1999 | Grot et al. | |
| 6,220,333 B1* | 4/2001 | Cantwell | B22D 17/2245 164/229 |
| 6,533,181 B1* | 3/2003 | Roxby | G06K 1/121 235/462.01 |
| 7,604,181 B2* | 10/2009 | Culp | G06K 1/121 235/385 |
| 7,611,058 B2* | 11/2009 | Culp | G06K 7/10 235/454 |
| 2001/0022774 A1* | 9/2001 | Cantwell | B22D 17/2245 369/275.4 |
| 2002/0050332 A1* | 5/2002 | Cantwell | B22D 17/2245 164/98 |
| 2003/0015307 A1* | 1/2003 | Cantwell | B22D 17/2245 164/4.1 |
| 2004/0169928 A1 | 9/2004 | Nilsen et al. | |
| 2004/0240006 A1 | 12/2004 | Staub et al. | |
| 2010/0006640 A1* | 1/2010 | Culp | G06K 1/121 235/375 |
| 2010/0294844 A1* | 11/2010 | Loiret-Bernal | B30B 15/065 235/494 |
| 2011/0014131 A1 | 1/2011 | Sandeep et al. | |
| 2011/0150342 A1* | 6/2011 | Franken | G06K 19/16 382/190 |
| 2013/0038936 A1* | 2/2013 | Franken | B29C 45/372 359/567 |
| 2014/0263674 A1* | 9/2014 | Cerveny | G06K 19/06028 235/494 |

FOREIGN PATENT DOCUMENTS

| | | |
|---|---|---|
| DE | 20 2011 108 698 U1 | 3/2012 |
| JP | S59-093338 | 5/1984 |
| JP | 2005-329546 | 12/2005 |
| WO | 96/24864 | 8/1996 |
| WO | 2005/048252 | 5/2005 |
| WO | 2013/105974 | 7/2013 |
| WO | 2013/165415 | 11/2013 |

OTHER PUBLICATIONS

International Preliminary Report on Patentability and Written Opinion dated Oct. 13, 2015 in International Patent Application No. PCT/DK2014/000018.

European Patent Office Communication dated Aug. 17, 2016 in corresponding European Patent Application No. EP 14 78 3207.

* cited by examiner

METHOD AND APPARATUS FOR PRODUCING A 2D BARCODE ENCODED PART BY MOLDING BEING IDENTIFIABLE USING A SMARTPHONE

CROSS REFERENCE TO RELATED APPLICATIONS

This application is the National Phase entry of PCT/DK2014/000018, which claims priority to Denmark Patent Application No. PA 2013 00222, filed Apr. 13, 2013. The content of these applications is incorporated herein by reference in their entirety.

FIELD OF THE INVENTION

The present invention relates to a method and apparatus for manufacturing polymer parts with an integrated encoding or unique encoding in the surface, capable of being read by a smartphone or similarly equipped device.

It furthermore relates to a system of storing production data and relating the said data to the encoding in the said polymer part, providing the part and depending uses with traceability during and after its life cycle.

It furthermore relates to mass-produced polymer parts with a mean to be uniquely identified, making it possible to trace each part through their use.

BACKGROUND OF THE INVENTION

In biotechnological, medical, technical and consumer applications, it is desirable to be able to link the physical product with digital information about the product. Such information could be common to a larger number of identical parts, such as manuals, ordering information, recycling information, or be related to the individual product, such as its manufacturing history or other relevant information about use of the product and be able to track the individual part during its use. Many such products are made by mass-replication techniques such as injection molding or extrusion coating, where each replication is similar and every part therefore practically indistinguishable from all other thus produced parts. It would be desirable to have a system where the molded parts may be encoded during molding without any additional processes, and be even more desirable in the case where each individual produced part could be easily identified and linked uniquely to its manufacturing conditions, use, age or other parameters important to the use or replacement of the part. It would be further desirable if this identification of each individual part would be fast and without the requirement of expensive and specialized equipment.

Molding of polymer parts is typically a fast process, where a replica is made of the mold once every few seconds or faster. If the above solution is to be industrially relevant for making unique codes, the change of the mold configuration should be executed within this time-frame. Furthermore, in most applications, no change of the macro-geometry is allowed.

To solve this problem, we have invented a method based on optical anisotropy, where the rotational state of a small area will change the reflectance in a given direction greatly, and may be determined by optical means, such as photography under simultaneous illumination.

The optically anisotropic surfaces are arranged in an array where each dot or bit in the array will define either a bright or dark state when illuminated and viewed from a given angle. In some embodiments, each of the areas of optically anisotropic surface may be individually rotated to alter the orientation of the optical anisotropy. Non-limiting examples of optically anisotropic surfaces are linear diffraction gratings, linear ridge gratings, oriented micro-reflectors or surfaces with a preferential direction of the surface roughness. By replication of these surfaces, the replica will obtain the same type of optical anisotropy as the master array.

These surfaces may be designed such that the perceived brightness for each individual element of the array will depend in a binary way (dark/bright) depending on the rotational orientation of the said element. The readout of the pattern may preferably be done by optical means, where the camera and the illuminating light source are placed close together, e.g. as in a smart-phone or a tablet.

The novelty and inventive step of the invention is realized by the surprisingly high contrast obtainable by optically anisotropic (surface) structures made on the surface of a single and homogeneous material, allowing detection thereof by consumer devices such as smartphones. Furthermore is the combination of a method where each mass-produced part is uniquely identifiable and a readout method using smartphones novel, and the possibility of using readily available devices with integrated data network capabilities, light source and camera, such as smartphones, makes this method industrially applicable, both for use in the industry and for consumers.

OBJECT OF THE INVENTION

It may be seen as an object of the present invention to provide a mean to make a code on a molded part without introducing additional process steps.

It may be seen as an object of the present invention to provide a method for mass-producing large numbers of polymer parts with unique codes, each individually traceable or identifiable. It may be seen as a further object of the invention to provide a data-structure to couple the information relevant to the individual polymer part to the identifier on the said part. It may be seen as a further object of the method to make this coupling possible using readily available equipment, such as smartphones.

It is a further object of the present invention to provide an alternative to the prior art.

DESCRIPTION OF THE INVENTION

The simples aspect of the invention regards the use of surface structures reflecting light differently in different directions, controlling these directions in a mold surface, and thereby using these surface structures to generate a code which may be interpreted as e.g. an internet link, e.g. using the industry standard QR-code interpretation. The codes may either be defined in the mold in a stationary way, e.g. by milling the surface of the mold to generate the surface structures giving the effect. The surface structures will, depending on their orientation be perceived as either bright when the reflectance in the direction of the light source and camera is high, or dark when the reflectance in the direction of the light source and camera is low.

In a special embodiment, the invention here presented regards the process of manufacturing of a molded part comprising an array of circular areas with optical anisotropic surfaces detectable by optical means. Each circular area comprise one bit, whose value may be determined by determining the rotational state of the bit.

In a second embodiment surface structures based on optically anisotropic surface structures arranged in an array where the orientation of each individual part of the array is selectable and reconfigurable, and where this selection and reconfiguration may be performed in a timespan short enough, not to significantly affect the cycle time of the mass-production production.

Figure 1:
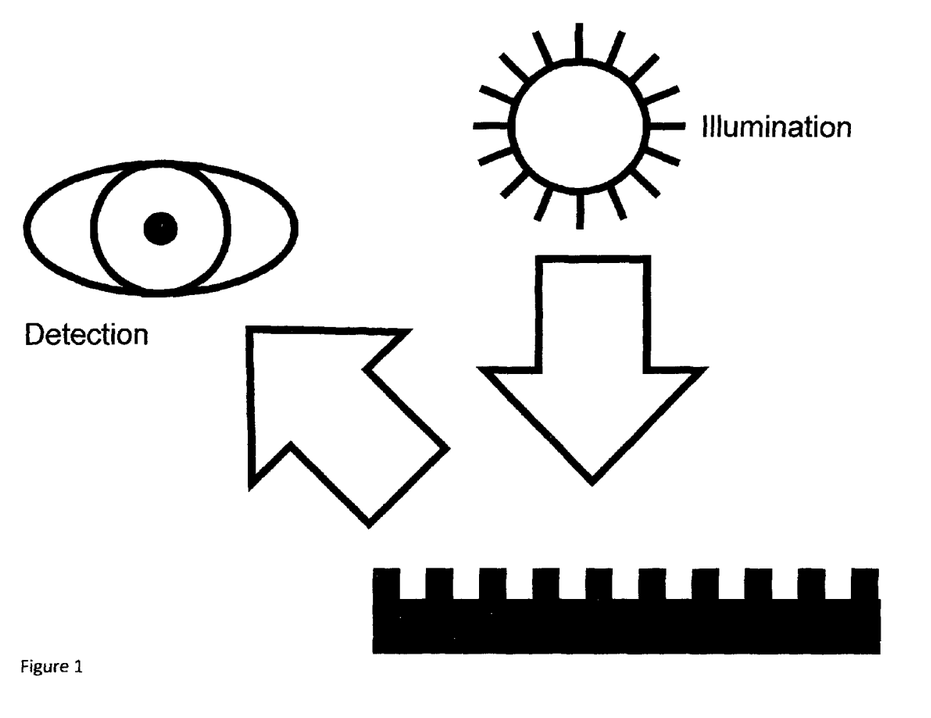
FIG. 1. Cross-sectional view of a square, linear diffraction grating. When illuminated from angle perpendicular to the diffraction grating lines (i.e. in the plane of the figure), light is diffracted in all directions perpendicular to the lines. However, different wavelengths of the light will be diffracted in different directions, and diffraction will only take place perpendicular to the diffraction grating lines.
Figure 2:
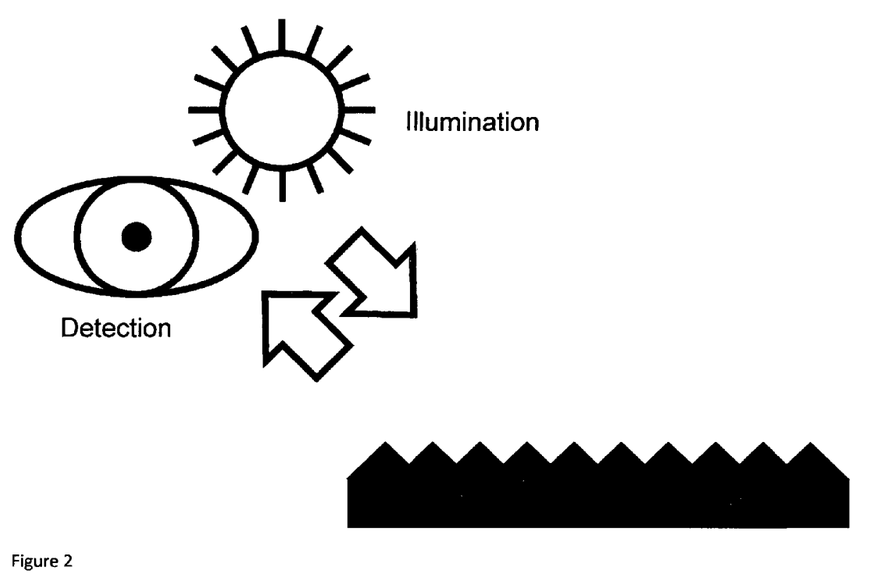
FIG. 2. Cross sectional view of a linear ridge grating reflective structure with optimal reflection at 45 degrees relative to the part plane. By simultaneous illuminating and viewing of the part under this angle, the area will appear bright. By varying the inclination of the reflective structures, this window may be expanded to for example 30 to 60 degrees, but at the cost of a lower reflection in the measurement window. If the structure is turned 90 degrees around an axis perpendicular to the part surface, no reflection will happen, and the area will appear dark. It is thus possible to change the observed optical properties of the area from bright to dark by changing the alignment of the surface structures.
Figure 3:
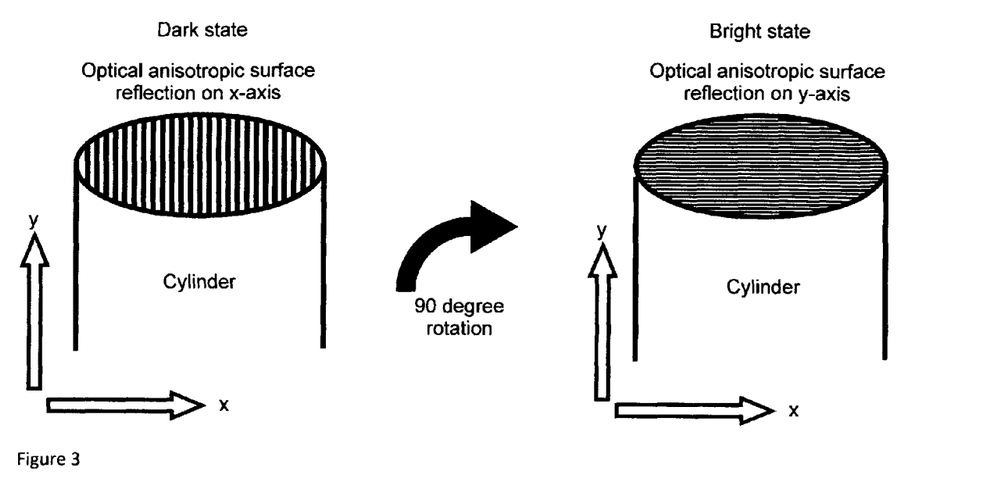
FIG. 3. One cylinder, comprising one bit in the 2D binary barcode. By aligning the optical anisotropic structures and configuring the rotational state of the cylinder, the perceived brightness of the surface when simultaneously illuminating and viewing from a plane perpendicular to the x-axis may be swit+ched between a dark and a bright state.
Figure 4:
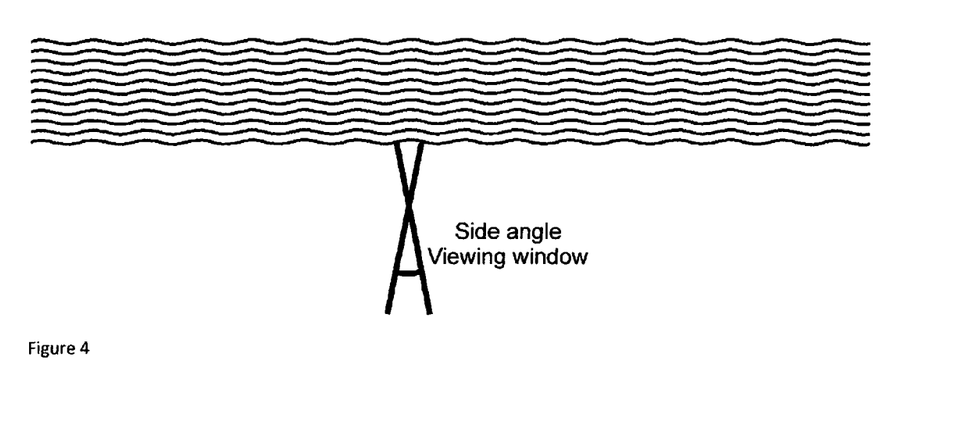
FIG. 4. Top view of either reflective or diffractive line patterns. A method for expanding the viewing window regarding the side angle is to wobble the lines. When viewing the structure within a side angle interval there will always be a given proportion of the lines in the area that are perpendicular to the observer. The more the wobbling of the lines, the larger a window will be available, but simultaneously reducing the intensity of the (bright) signal.
Figure 5:
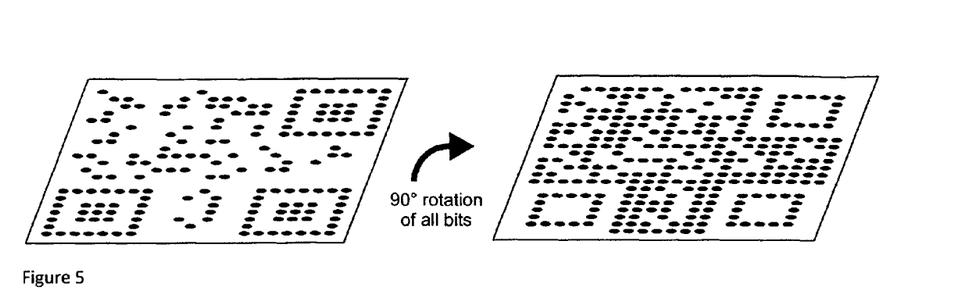

Optically anisotropic structures are defined by having different optical properties depending on their orientation to the viewer and the illumination. Examples of different physical effects giving rise to optical anisotropy is diffraction effects, where structures with length scales comparable to those of visible light are aligned is such a way that diffraction only happens in certain directions. The most simple example would be a linear diffraction grating which will only diffract light in directions perpendicular to the grating lines. A cross-section of the lines defining the diffraction grating is shown in FIG. 2 along with the in-plane viewing and illumination. Another example of a physical effect that may give rise to optical anisotropy is reflection, provided that the surface structures are aligned such that the reflection will differ depending on the perception angle. The most simple example of this is a linear pattern with relatively high surface inclination, for example 45 degrees. If viewed and illuminated from a 45 degrees angle perpendicular to the structures, the surface would be highly reflective of the illumination source, whereas if viewed from a 45 degrees angle but parallel to the lines, the illumination source would not be reflected back into the detector. A cross-section of this is shown in FIG. 3. Reflection effects may both be obtained using well-controlled methods, such as milling, or by more random processes with a preferential direction, such as grinding. The principle of interpreting the optically anisotropic surface as a binary array is shown in FIG. 4. The reflection based anisotropy will be more in-plane angle dependent than the diffraction based anisotropy, however, it will in general have a much higher contrast than diffraction based surfaces, and be less dependent of the wavelength of the light that the surface is illuminated by. To get a robustness towards non-perfect alignment of the viewer/camera and the illumination source, some variation of the surface pattern may be integrated on purpose, for example by wobbling the lines of the diffraction grating +/−15 degrees (see FIG. 5) or manufacturing the reflective structures with an angle relative to the horizontal plane in an interval, for example from 30 to 60 degrees, while simultaneously wobbling the lines +/−15 degrees to obtain a higher angular window where the contrast is observable (i.e. in which window direct diffraction or reflection may take place). Effectively, a wobbling may be achieved through optical lithographical means, or by imperfectly near-unidirectional sanding of a surface.

To turn the contrast on or off, each individual part of the array may be turned a given angle, for example 45 or 90 degrees, in order to switch the reflection or diffraction on or off for a given observation and illumination direction. In order to not distort the macroscopic geometry of the mold and thereby also the molded part, the features on the surface are required to be microscopic, and would preferably be less than 100 μm high, and more preferably in the range from 1-100 μm for reflective structures and in the range of 0.4 μm to 2 μm for diffractive structures. In order to make the array as small as possible, each individual area should also be as small as possible, and would preferably be less than 2 mm in diameter, more preferably around 1 mm, and most preferably around 0.5 mm. The distance between two individual areas should also be as small as possible in order to make the total area as small as possible and in order to get as high contrast as possible, as this area is not able to change contrast, and will only give rise to background noise in the image.

Figure 6:
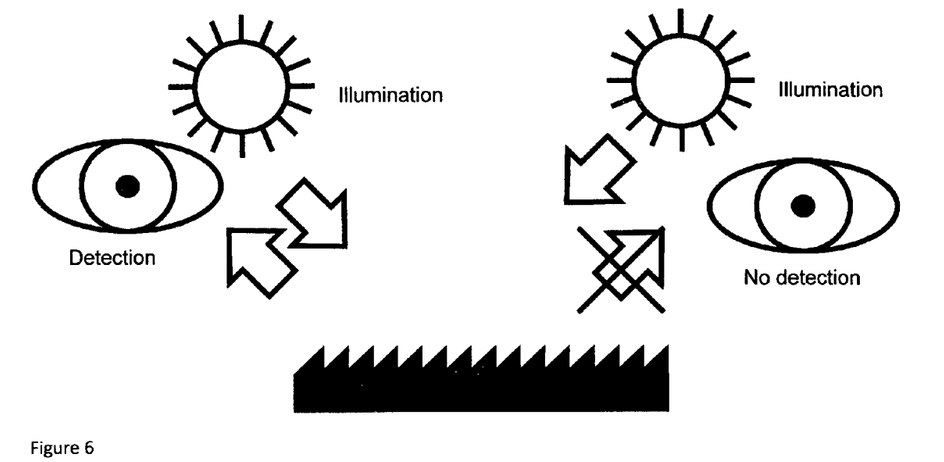
FIG. 6. Optically anisotropic pattern with one bright detection direction when perceived under an angle of 45 degrees. In all other directions no reflected light will be detected due to the slope of the surface structures, thus being dark states. It will hence be useful for mounting on single-curved surfaces, where only 0 and 180 degrees rotation states are acceptable in order for the bit to follow the macro geometry of the shaping surface.
Figure 8:
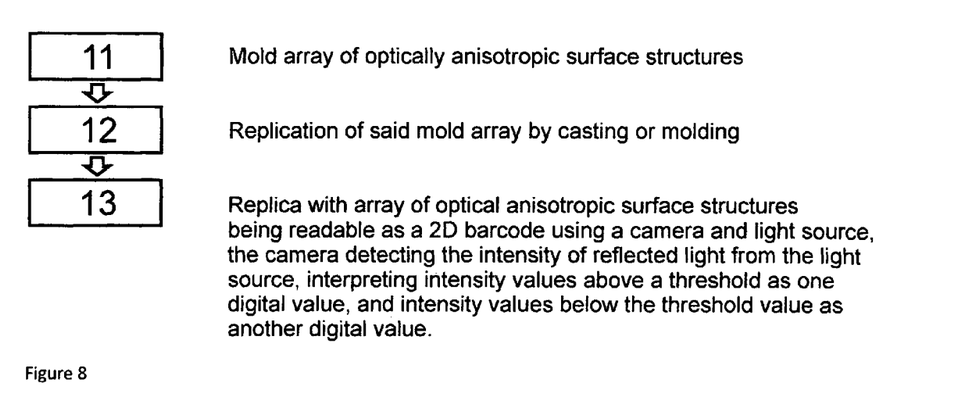
FIG. 8 shows a flow-chart of the minimum aspect of the disclosed invention. First an initial mold part with optical anisotropic surface areas in an array (11) is defined in the mold surface. Then the mold part is being used in a molding process to form a molded part (12), which comprises a 2D barcode consisting of optically anisotropic surface areas defined in a homogeneous and continuous material, readable by a camera under the illumination of a light source, by detecting the amount of reflected light from different points in the array, interpreting values under a given threshold as e.g. 0 and values above the threshold as e.g. 1.

The device for integration in a mold would typically be made of mold compatible materials like hardened steel, aluminum or other hard materials. As each bit in the array needs to be switchable, a switching mechanism needs to be present. Many methods for turning or rotating a small pin exist, either using a small electric motor, pressurized air, hydraulics, martensitic, piezoelectric, magnets or electrostatic forces. A computer controlled system will control the switching and simultaneously record or store the configuration of the array in a database, along with any other relevant information belonging to the part being molded on the array. Relevant information stored in the database could be process conditions, operator, machine settings, material batch, instructions of use of the part. In a preferred embodiment, the array forms a 2D barcode which may be transformed into an internet or database link to a web page displaying this information, using commonly used standards, such as the QR Code developed by DENSO WAVE INCORPORATED. A sketch of the proposed mold surface and how it would be perceived under the optimal viewing angle and at the 90 degrees rotated angle is shown in FIG. 6. Other structures, such as surfaces with orthogonal lines may also be used, where the reflection or diffraction intensity will have a maximum for every 90 degrees of rotation, thereby having to be rotated 45 degrees between light and dark configuration. A series of photographs illustrating this is shown in FIG. 8. Likewise, a hexagonal pattern would give six intensity maxima for every full rotation, thereby only having 30 degrees rotation between minimum and maximum perceived intensity.

In another preferred embodiment, the bits of the 2D binary barcode is arranged in a hexagonal pattern in a base plate in order to maximize the area that is rotatable, and hence the perceived contrast. Preferably, the individual bits are as close to each other as possible, in order to further reduce the area which is not configurable, and hence also increase the contrast.

In another preferred embodiment, the cylinders are conical with the widest end facing the shaping surface, comprising the optically anisotropic surface. This ensures that the molding pressure will not be able to move the conical cylinders, while still allowing the said base plate to have structural integrity.

Figure 7:
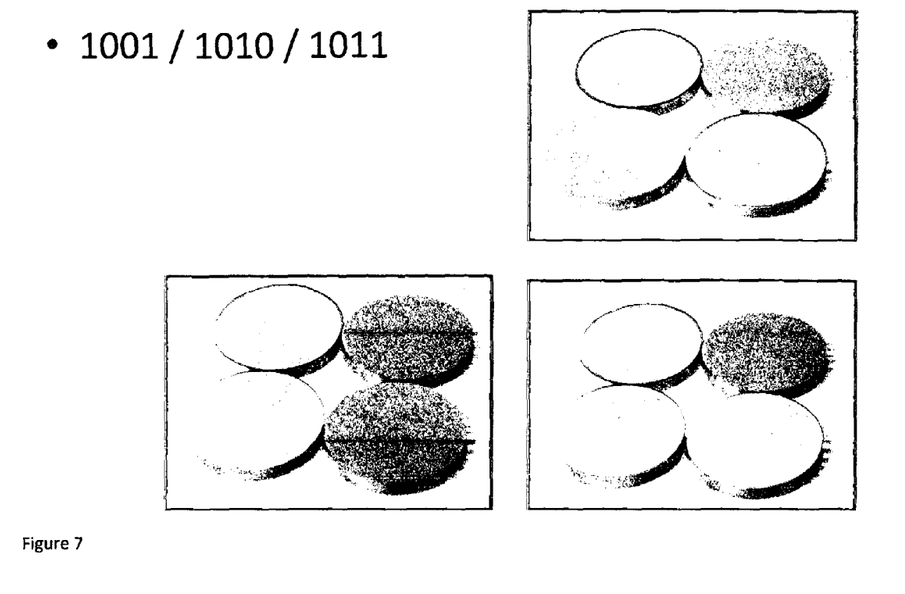
FIG. 7. A photograph of four circular discs with orthogonal lines turned in different directions, thus giving different combinations of high and low reflection of the light source towards the camera.

In a special embodiment, the surface of the mold is non-planar, preferably single curved, for example for mounting on a roll-to-roll polymer shaping process, such as extrusion coating or casting. For each bit in the array, to be able to change between bright and dark state and still follow the single curved surface, the rotation is required to be 180 degrees. An example of a surface structure with a 180 degree distance between the bright and the dark configuration is shown in FIG. 7.

In a further special embodiment, a polymer replica, comprising optically anisotropic structures, is metalized subsequent to the molding process, thereby increasing its reflectivity. The increase in reflectivity ensures that most wavelengths of the electromagnetic radiation spectrum from low radio frequency to visible light, will be reflected, and thus may be detected. In this special embodiment, the 2D binary barcode may be used as a RFID chip, detectable by radio frequency radiation, preferably in the frequency range of 1 to 100 GHz.

The invention relates to a method for producing a part or replica by molding or casting with an embedded 2D barcode defined in the surface of said part and the said embedded 2D barcode subsequently being readable using a light source and a camera, said method comprising at least the following steps:

provide an initial mold with an array of individual areas of optical anisotropic surface structures, where at least a number of the said individual optical anisotropic structures forms a two-dimensional barcode or data matrix making a replica of the mold using a molding or casting process, thereby making a part comprising a replica of the said array of individual areas of optical anisotropic surface structures said replica of the said mold, comprising the said array of individual areas of optical anisotropic structures, having the property that the directional reflection coefficient of the individual areas of optical anisotropic surface structures is depending on the illumination angle and detection angle in a way that is not rotational symmetric around the axis normal to the surface of the said replica said array of individually optical anisotropic surface structures of the said replica thereby being readable by illumination and detection of reflection intensity of said illumination source under a non-normal angle to the surface of the said replica The invention furthermore relates to a method where the individual areas of optically anisotropic structures in the mold is independently rotatable in such a way that a new code can be defined in the mold between each molding or casting process.

The invention furthermore relates to a method where topography of the said individual optically anisotropic surface structures are a linear ridge pattern with sidewall slopes between 45 degrees and 5 degrees relative to the surface of the mold.

The invention furthermore relates to a method, where line spacing in the said linear ridge pattern is between 5 µm and 250 µm The invention furthermore relates to a method where the optical anisotropic structure is non-horizontally oriented reflector areas, a diffraction grating with a period less than 5 µm or linearly oriented light spreading structures.

The invention furthermore relates to a method where the configurations of the array during molding is stored in a database linking the stored data to product or process information about the individual product or groups of individual products.

The invention furthermore relates to a method where the array is a 2D binary barcode, where the number of individually rotatable elements in the said array is at least 25, more preferably more than 100, even more preferably more than 200 and most preferably more than 400.

The invention furthermore relates to a method where the stored data comprises information about the processing conditions of the said part.

The invention furthermore relates to a product where the molding or casting process is either injection molding, extrusion coating, gas assisted injection molding, blow molding, compression molding, calendering, extrusion, casting, deep drawing or coining.

The invention furthermore relates to a product where the said product consists of polymer, glass, metal, ceramic or composite of two or more thereof.

The invention furthermore relates to a method where the individual areas of the said array has an area of less than 2 $mm^2$, more preferably less than 1 $mm^2$, even more preferably less than 0.5 $mm^2$ and most preferably less than 0.2 $mm^2$.

The invention furthermore relates to a method where the device used for identification of the optically anisotropic structures on the said part is a smart phone or tablet with integrated camera, light source and data network access.

The readout of the array is preferably done using a device with a camera and a light source which is in proximity to each other relative to the distance from the camera/light source to the array. A preferred example would be a typical smartphone where the flash or illumination is placed a few centimeters apart, and the typical viewing distance is from 5-10 cm and higher. When perceiving the array from the intended angle, the view of the array will be skewed, as the part closest to the camera will appear larger than the part furthest from the camera. This skewing may be compensated by software in the smartphone, as long as there are recognizable features appearing on all arrays. The QR Code uses three recognizable square patterns which may be used to perform this calculation, as is already done in QR Code scanning apps.

By optical anisotropy is meant the property of having different optical properties in the visible spectrum at different observation and illumination angles relative to the rotational state of the surface. Examples of surfaces with optical anisotropy are linear diffraction gratings, which diffract perpendicular, but not parallel, to the grating lines, linear ridge gratings or directional reflective prisms, where the reflection intensity will depend on the rotational state of the surface, or surfaces with a dominant direction for the surface roughness, such as grinded or profile grinded surfaces.

By a smartphone is meant a device capable of illuminating a part, acquiring and storing images in the internal memory of the said, processing these images in order to convert the image to a binary 2D barcode, calculating an internet link corresponding to this barcode, and having direct or indirect internet or database access to retrieve the information stored at this internet or database link. Non-limiting examples of smartphones are the Apple Iphone series, the Samsung Galaxy series or other devices with the same functionality as these, such as tablets or wifi/internet-capable cameras.

By continuous material is meant a material where the bulk optical properties, such as the color or refractive index, of the material is not changing throughout the material. Examples of continuous materials are single-melt molded polymers, bulk metals pressed or molded into shape. Continuous materials may have non-continuous surface optical properties caused by the surface topography of the material.

By molding is meant any process where a molten material is solidified by contact with a shaping surface with a temperature lower than the solidification temperature of the molten material. Non-limiting examples of molding processes are injection molding, casting, extrusion, roll-to-roll extrusion coating and roll-to-roll casting.

By bit is meant each area in the array, typically one rotatable cylinder with an optically anisotropic surface facing the cavity side of the mold, or facing the surface of the roller.

By cylinder is meant a 3-dimensional shape that is rotational symmetric, such as cylinders, but would in the context of this application also cover cylindrical cones or other rotational symmetric shapes.

By RFID is meant a Radio Frequency IDentifier, where the 2D barcode will be detectable by other frequencies of electromagnetic radiation than visible light. Most materials are relatively permeable to radio frequency radiation, and thus will an RFID not require line of sight to be identified.

By readable is meant a surface pattern which is recognizable by a reading device as specified using the value of spatial reflectance as parameter. If the spatial reflectance in a given point is above a threshold value, the point is recognized, as e.g. the digital value of 1, and if the spatial reflectance is below the threshold value, the point is recognized as e.g. the digital value of 0. In this context, such a device is a consumer electronic device, such as a smartphone or a tablet or other device featuring a camera and a light source. The device will preferably have processing abilities and network access to transform the image of the code into a digital entity, such as e.g. a number, text string or internet link.

By light is here meant a controlled and localized source of electromagnetic radiation, which is used to probe the surface with the goal of determining the rotational state of the individual bits in the 2D binary barcode. The wavelength of the light is preferably in the range of 400-800 nm, but in special embodiments other wavelengths of electromagnetic radiation may also be used, such as radio frequency electromagnetic radiation.

All of the features described may be used in combination so far as they are not incompatible therewith.

BRIEF DESCRIPTION OF THE FIGURES

The method and apparatus according to the invention will now be described in more detail with regard to the accompanying figures. The figures show one way of implementing the present invention and is not to be construed as being limiting to other possible embodiments falling within the scope of the attached claim set.

FIG. 5. Perceived brightness of the surface of a molded part under two different viewing angles relative to the orientation of the bits. By configuring the orientation of the individually rotatable areas in the mold, the part will obtain the same optical anisotropy as the mold. The pattern of the array may preferably be configured to fit the standard QR Codes from DENSO WAVE INCORPORATED, which is the standard being globally used for 2D binary barcodes. By turning the viewing angle 90 degrees, the pattern is inverted (and rotated 90 of course, not shown). However, since there are a number of bits being used as alignment marks, these will be recognized as being inverted, and the image will hence be inverted prior to decoding. Surface structures resulting in inversion of the optical intensity for every 45 degrees of rotation also exist. An orthogonal pattern of lines would give this effect, and thereby would any side-on viewing (as opposed to corner-on viewing) of the code have the right bright/dark polarization.

DETAILED DESCRIPTION OF AN EMBODIMENT

In a first example a mold for a medical device requiring individual traceability is mounted with a 21×21 array of circular 0.3 mm diameter cylinders with the one end being fabricated to form triangular (in cross-sectional view) lines (as seen from above the plane of the mold) with a slope between 30 and 60 degrees (relative to the mold surface plane), a height of 30 µm, a line wobbling of +/−5 degrees and a center-center distance of neighboring cylinders of 0.4 mm. The mold is used to mold one medical device, whereafter the configuration of the array is changed by a mechanical actuator rotating at least one cylinder 90 degrees. After re-configuration the mold is used to mold a further medical device with a new and unique 2D barcode. Before use of the medical device, the user may scan the 2D barcode in order to get confirmation that the individual product is within spec, to get additional and up-to-date information about the use and send a message to the medical device manufacturer about where the device is used, in order to be able to contact the user if problems with the product batch should arise in the future.

In a second example a mold for a car part is mounted with a 25×25 array of circular 1 mm diameter cylinders with the one end being fabricated to form triangular (in cross-sectional view) lines (as seen from above the plane of the mold) with a slope between 30 and 60 degrees (relative to the mold surface plane), a height of 30 μm, a line wobbling of +/−5 degrees and a center-to-center distance of neighboring cylinders of 1.2 mm. The mold is used to mold one part, where after the configuration of the array is altered by a mechanical actuator rotating at least one cylinder 90 degrees. After re-configuration the mold is used to mold a further part with a new and unique 2D barcode. The barcode may be read by taking a photograph using flash illumination in an angle between 30 and 60 degrees (relative to the product surface plane) and +/−5 degrees relative to the alignment marks in the barcode, for instance using a conventional smartphone. The barcode links to an internet page accessible by the smartphone with documentation, use, replacing and recycling instructions which may be accessed if the part needs replacement, or as confirmation of choice of replacement part. Furthermore, the user confirms that the part has been mounted in a car. Furthermore, in the event that the selected part is an illegal copy of an original and copyright protected product, accessing the database either with a wrong or a previously used code will generate a warning, informing the user and the parts manufacturer, that the particular part is an un-registered copy of an original spare part.

In a third example a roller for manufacturing foils by extrusion coating is mounted with a number of 21×21 arrays of circular 0.3 mm diameter cylinders with the one end being fabricated to form a linear diffraction grating with a period of 700 nm and a height of 200 μm, a line wobbling of +/−5 degrees and a center-to-center distance of neighboring cylinders of 0.4 mm. The roller is used with a rotational frequency of one pr second to extrude foil. Every second, the configuration of the the array is changed by a mechanical actuator rotating at least one cylinder 90 degrees. The 2D barcode contains batch information and manufacturing time stamp accessible upon scanning of the barcode. The foil is used to package foodstuff, and information about the content of each individual foodstuff package is linked to the code on the packaging.

In a fourth example, a mold for petri dishes for In Vitro Fertilization (IVF) is fitted with a 21×21 array of circular 0.3 mm diameter cylinders with the one end being fabricated to form a linear diffraction grating with a period of 700 nm and a height of 200 μm, a line wobbling of +/−5 degrees and a center-to-center distance of neighboring cylinders of 0.4 mm. The array is configured in a state resembling a QR-compatible 2D binary barcode, stating the overall link to the batch, an internet link to access documentation of the product, and a serial number. The mold is being used to make rapid successive replications of the mold, and between each replication the serial number is increased by 1. During beginning of use, each individual dish is being linked to the samples being processed in the dish by scanning the code and entering the relevant information into the database. In order not to mix up samples in the IVF lab, each petri dish may be scanned at any time, thus validating which dish has been used, thereby ensuring that the IVF samples and the intended patients are correctly matched.

In a fifth example a mold for petri dishes for In Vitro Fertilization (IVF) is fitted with a 21×21 array of circular 0.3 mm diameter cylinders with the one end being fabricated to form one area where the surface roughness Ra is about 10 nm and the second area has a roughness Ra of about 500 nm, and a center-to-center distance of neighboring cylinders of 0.4 mm. The mold is used repeatedly to make petri dishes with a cycle time of 2 seconds, and the configuration of the array is changed in between each molding by a mechanical actuator mounted on a miniature x-y-z stage, capable of turning each bit by 90 degrees. The petri dishes thereby obtains a unique surface pattern within the array, which may be detected using either a specialized system reading the petri dishes from the bottom, or by using a smartphone with image recognition software. The reading of the individual pattern opens a database entry page, where the use and process progress of the individual petri dish may be noted for future traceability.

In a sixth example, a number 21*21 array of circular 2 mm diameter conical cylinders with optically anisotropic structures comprising linear prisms are fitted on a cooling roller used for calendering or extrusion coating. The roller is used to make roll to roll production of foil comprising anisotropic surface structures. Subsequent to the molding step, the foil is metalized with a 5 nm layer of aluminum, and subsequent to this step, a protective polymer coating 10 μm thick is extrusion coated on top of the aluminum. The foil is cut out to comprise individual 2D binary barcodes. The 2D barcodes are used as RFID tags, being detectable by phase contrast imaging at 5 GHz and a bandwidth of 50 MHz with a spatial resolution of 1 mm, using multiple probe signal antennas, placed in fixed and known locations relative to the RFID and the receiver, with either time or frequency domain multiplexing and a single receiver. By determining the identity of the probe antenna by determining either the frequency of the detected signal or the time stamp of the detected signal, and thereby knowing the angle of reflection for each individual bit, the identity of the RFID may be determined. This setup is then used for scanning of incoming goods, each individually tagged, to a warehouse.

In a seventh example, a 21*21 array of square 0.5 mm side length areas with optically anisotropic structures comprising linear ridge gratings are milled into the surface of an injection molding tool. The tool is used to make multiple replicas all featuring the same code. The code may be interpreted as an Internet link according to the QR code industry standard, linking to a web-page where assembly, recycling and purchase information about the product of which the replica is a part of is stored.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

All patents and non-patent references cited in the present application are also hereby incorporated by reference in their entirety.

The invention claimed is:

1. A method for producing a part or replica by molding or casting with an embedded 2D barcode defined in the surface of said part and said embedded 2D barcode subsequently being readable using a light source and a camera, said method comprising at least the following steps:
   providing an initial mold with an array of individual areas of optical anisotropic surface structures, where at least a number of said individual optical anisotropic structures forms a two-dimensional barcode or data matrix; and
   making a replica of the mold using a molding or casting process, thereby making a part comprising a replica of said array of individual areas of optical anisotropic surface structures,
   wherein said replica of said mold, comprising said array of individual areas of optical anisotropic structures, has the property that the directional reflection coefficient of the individual areas of optical anisotropic surface structures is dependent on the illumination angle and detection angle in a way that is not rotationally symmetric around the axis normal to the surface of said replica,
   wherein said array of individually optical anisotropic surface structures of said replica thereby being readable by illumination and detection of reflection intensity of said illumination source under a non-normal angle to the surface of said replica, and
   wherein the individual areas of optical anisotropic structures in the mold are independently rotatable in such a way that a new code can be defined in the mold between each molding or casting process.

2. A method according to claim 1, wherein a topography of each of said individual optical anisotropic surface structures is a linear ridge pattern with sidewall slopes between 45 degrees and 5 degrees relative to the surface of the mold.

3. A method according to claim 2, wherein a line spacing in said linear ridge pattern is between 5μm and 250 μm.

4. A method according to claim 1, wherein the optical anisotropic structure is a non-horizontally oriented reflector area, a diffraction grating with a period less than 5 μm, or a linearly oriented light spreading structure.

5. A method according to claim 1, wherein the configuration of the array during molding is stored in a database linking the configuration to product or process information about the individual part or replica or groups of individual parts or replicas.

6. A method according to claim 5, wherein the product or process information comprises information about the processing conditions of said part or replica.

7. A method according to claim 1, wherein the array is a 2D binary barcode, and wherein the number of individually rotatable areas in said array is at least 25.

8. A product made according to the process of claim 1, wherein the molding or casting process is selected from injection molding, extrusion coating, gas assisted injection molding, blow molding, compression molding, calendering, extrusion, casting, deep drawing or coining.

9. A product made according to the process of claim 1, wherein said product consists of polymer, glass, metal, ceramic or a composite of two or more thereof.

10. A method according to claim 1, wherein the individual areas of said array has an area of less than 2 mm$^2$.

11. A method according to claim 10, wherein the area is less than 1 mm$^2$.

12. A method according to claim 11, wherein the area is less than 0.5 mm$^2$.

13. A method according to claim 12, wherein the area is less than 0.2 mm$^2$.

14. A method according to claim 1, further comprising the step of reading the 2D barcode or data matrix using a smart phone or tablet with integrated camera, light source and data network access.

15. An apparatus for molding a product comprising on its surface a molded 2D barcode or data array readable using a light source and a camera, the apparatus comprising:
   a mold comprising an array of individual areas each comprising optically anisotropic surface structures, which array forms a 2D barcode or data array, wherein each of the individual areas is rotatable such that the optical anisotropy is varied for a given observation and illumination direction;
   a switching mechanism arranged to rotate one or more of the individual areas in the array in order to vary the resulting 2D barcode or data array, and
   a control system to control the rotation of the individual areas of the array and to associate the configuration of an array with other data related to the product.

16. A method for molding or casting products, the products having molded or cast in their surfaces a 2D barcode or data array readable using a light source and a camera, and which 2D barcode or data array is specific to a single product or group of products, the method comprising:
   providing a mold comprising an array of independently rotatable individual areas having a optically anisotropic surface structures thereon, wherein the array forms a 2D barcode or data matrix, and wherein the directional reflection coefficient of the optically anisotropic surface structures is dependent on illumination angle and detection angle in a way that is not rotationally invariant about the axis normal to the mold surface;
   recording the configuration of the array in a database;
   making at least one replica of the mold in a molding or casting process to produce one product or a group of products having thereon a 2D barcode or data array;
   rotating at least one of the individual areas of the array forming the 2D barcode or data array;
   recording the new configuration of the array in the database, and
   making at least one replica of the newly configured mold in a molding or casting process to produce a second product or group of products having thereon a second 2D barcode or data array.

* * * * *